Patented May 30, 1950

2,510,009

UNITED STATES PATENT OFFICE 2,510,009

VINYL CHLORIDE RESIN PLASTICIZED WITH AN AROMATIC HYDROCARBON AND STABILIZED BY DYPNONE

Paul F. Bruins, Douglaston, and Ernst P. Rittershausen, Hempstead, N. Y., assignors to Socony-Vacuum Oil Company, Incorporated, a corporation of New York No Drawing. Application December 30, 1948, Serial No. 68,424

10 Claims. (Cl. 260—33.6)

The present invention relates to plasticizers for polyvinyl chloride and its copolymers and, more particularly, to color stable plasticizers for polyvinyl chloride and its copolymers and the resinous masses so produced.

Although such plastics as the acrylates and polystyrene are correctly classified as vinyl derivates, the term, as generally used in the industry, refers to those plastics which are specifically named polyvinyl. Thus, the group includes the following well-known and widely used products: polyvinyl chloride, polyvinyl chloride-acetate polymer, and similar copolymers of polyvinyl chloride. The family includes several types which differ from each other only in the nature of the atom or group which is linked to the vinyl radical. New types such as vinyl ketones and vinyl ethers are coming into prominence, and modifications are being made in the chemical structure of the older types.

Polyvinyl chloride is always plasticized by the incorporation of a high proportion of plasticizer to decrease its inherent rigidity. The most popular plasticizers for all-purpose application are tricresyl phosphate, dioctyl phthalate and dibutoxyethyl phthalate. In general, less plasticizer is required with polyvinyl chloride-acetate polymer than is used with polyvinyl chloride. The class of plasticizers applied to polyvinyl acetate may also be used in conjunction with the copolymers. Dioctyl and dibutyl phthalates, di-butyl "Cellosolve" phthalate, "Cellosolve" ricinoleates, glycerol esters, tricresyl phosphate, camphor, and triacetin are typical examples of suitable plasticizing agents. ("Cellosolve" is the trade name used for monoalkylethers of ethylene glycol. The formula for di-butyl "Cellosolve" phthalate is

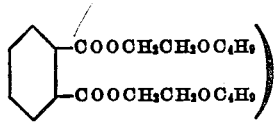

It will be noted that, although it has been known for some time that aromatic petroleum fractions can be used as extenders and plasticizers for various resins, aromatic petroleum fractions have not been widely used as plasticizers for polyvinyl chloride and its copolymers. This is readily explained by the fact that suitable aromatic petroleum fractions lack stability to light. When exposed to sunlight or ultraviolet light in a Fadeometer, materials made of polyvinyl chloride and its copolymers plasticized by aromatic petroleum fractions darken in color. This has been considered a serious drawback and has limited the use of aromatic petroleum fractions.

It has now been discovered that the light instability of polyvinyl chloride and its copolymers plasticized by aromatic petroleum fractions can be overcome and light stable vinyl resins plasticized by petroleum fractions can be produced by incorporation in the aromatic petroleum fraction or in the resin mix a material which stabilizes the mixture against the darkening effect of sunlight or ultraviolet light.

It is an object of the present invention to provide a plasticizer for polyvinyl chloride resins comprising an aromatic petroleum fraction and an amount of a condensation product of acetophenone having an empirical formula represented by $C_{16}H_{14}O$ effective to stabilize said fraction and vinyl resin plasticized therewith to light. It is a further object of the present invention to solely plasticize polyvinyl chloride and its copolymers with a condensation product of acetophenone having an empirical formula represented by $C_{16}H_{14}O$.

These and other objects and advantages will become apparent from the following description.

Broadly stated, it has been found that the admixture of substances compatible with aromatic mineral oil fractions and polyvinyl chloride resins and possessing the ability of absorbing ultraviolet rays solves the problem of stabilizing the color of aromatic mineral oil fractions and vinyl resins containing such plasticizers when exposed to actinic light. Representative of this class of compounds meeting both requirements, i. e., compatibility and absorption of ultraviolet light rays is that compound known by the chemical name of dypnone. Dypnone is a condensation product of acetophenone and may be prepared by the method described by N. O. Calloway and L. D. Green in the "Journal of the American Chemical Society," volume 59, pages 809–811 (1937). It has been reported that one manufacturer uses styrene as the starting material, oxidizes the styrene to acetophenone and then produces the dypnone, $C_{16}H_{14}O$, by the condensation described by Calloway et al. Some of the properties of dypnone are given in the following tabulation:

Table I

Empirical formula, $C_{16}H_{14}O$
Structural formula

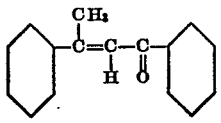

Specific gravity 20/20, 1.093
Molecular weight, 222.27
Viscosity @ 20° C., absolute, 39.7 centipoises
Refractive index @ 20° C., 1.6298
Boiling point ° C. (50 mm.), 246
Vapor pressure @ 20° C., <0.01 mm.

For reasons of economy, it is preferred at present to use a mixture of dypnone and a suitable aromatic mineral oil fraction as a plasticizer for polyvinyl chloride resins. However, dypnone may be used as the sole plasticizer for polyvinyl chloride resins with excellent results as is evident from the data presented in Table II (a, b, c).

Table II (a)

| Blend No. | I | II | III |
| --- | --- | --- | --- |
| Vinyl Resin VYNW,[1] per cent by weight | 70.9 | 59.41 | 59.41 |
| DOP,[2] per cent by weight | | | 39.6 |
| Dypnone, per cent by weight | 28.4 | 39.6 | |
| Stearic Acid, per cent by weight | | | |
| Dibasic Lead Stearate per cent | 0.7 | 0.99 | 0.99 |

[1] Vinyl resin VYNW is a copolymer of vinyl chloride and vinyl acetate.
[2] DOP is dioctyl phthalate.

Table II (b)

| Blend No. | I | II | III |
| --- | --- | --- | --- |
| Stress @100 per cent elongation | 2,700 | 810 | 720 |
| Tensile Strength, p. s. i. | 3,650 | 2,490 | 2,310 |
| Elongation, per cent | 220 | 295 | 370 |

Table II (c)

[Fadeometer @126° F.]

| Blend No. | I | II | III |
| --- | --- | --- | --- |
| Elapsed Time of Test: | | | |
| 1 hour | OK | VSO | OK |
| 2 hours | VSO | VSO | OK |
| 3 hours | VSO | VSO | OK |
| 4 hours | VSO | VSO | OK |
| 8 hours | VSO | VSO | OK |

SOC—slightly off color.
OC—off color.
VSO—very slightly off color.
OK—no perceptible color change.

While dypnone from the standpoint of technical results is a satisfactory plasticizer and light stabilizer when used alone, it is impractical at the present time for economic reasons to do so. However, in combination with the prior art aromatic mineral oil fractions, all of the desirable characteristics of the dypnone and the mineral oil plasticizer are retained and in addition the light instability of the petroleum fraction is overcome. Thus, a combination of aromatic petroleum fraction and dypnone provides a cheaper plasticizer for polyvinyl chloride resins than has previously been available and provides a light stable polyvinyl chloride resin.

Typical of the aromatic petroleum fractions which are suitable for use as plasticizers for polyvinyl chloride and its copolymers are the following:

| | A | B |
| --- | --- | --- |
| Gravity, °API | 2.0 | 4.7 |
| Flashpoint C. O. C., °F | 350 | 425 |
| Viscosity @ 100° F., (S. U. S.) | 110 | 19,000 |
| Mixed Aniline Point, °F | 66 | 76 |
| Boiling range, °F | 580-760 | IBP=740° F. |

Illustrative of the results obtained when using a mixture of an aromatic petroleum fraction and dypnone as a plasticizer for vinyl resin are the following:

Table III (a)

| Blend No. | IV | V | VI | VII | VIII | IX | X | XI | XII |
| --- | --- | --- | --- | --- | --- | --- | --- | --- | --- |
| Vinyl Resin per cent by wt | 59.41 | 59.41 | 59.41 | 59.41 | 59.41 | 59.41 | 59.41 | 59.41 | 59.41 |
| Aromatic Petroleum Fraction A do | 39.6 | | | | | | | | |
| 99 pts. aromatic fraction A, 1 pt. dypnone per cent by wt | | 39.6 | | | | | | | |
| 90 pts. aromatic fraction A, 10 pts. dypnone per cent by wt | | | 39.6 | | | | | | |
| 75 pts. aromatic fraction A, 25 pts. dypnone per cent by wt | | | | 39.6 | | | | | |
| 50 pts. aromatic fraction A, 50 pts. dypnone per cent by wt | | | | | 39.6 | | | | |
| Aromatic Petroleum Fraction, B do | | | | | | 39.6 | | | |
| 90 pts. aromatic fraction B, 10 pts. dypnone per cent by wt | | | | | | | 39.6 | | |
| 75 pts aromatic fraction B, 25 pts. dypnone per cent by wt | | | | | | | | 39.6 | |
| 50 pts. aromatic fraction B, 50 pts. dypnone per cent by wt | | | | | | | | | 39.6 |
| Dibasic lead stearate per cent | 0.99 | 0.99 | 0.99 | 0.99 | 0.99 | 0.99 | 0.99 | 0.99 | 0.99 |

Table III (b)

| Blend No. | IV | V | VI | VII | VIII | IX | X | XI | XII |
| --- | --- | --- | --- | --- | --- | --- | --- | --- | --- |
| Stress @ 100% Elongation | 1,750 | 1,780 | 1,630 | 1,160 | 710 | | | | 1,880 |
| Tensile Strength p. s. i. | 2,990 | 2,990 | 2,870 | 2,680 | 2,320 | 5,230 | 5,070 | 2,860 | 2,730 |
| Elongation percent | 225 | 255 | 220 | 240 | 260 | | 20 | 265 | 250 |
| Shore A, Hardness | 89 | 86 | 75 | 69 | 59 | 100 | 100 | 100 | 85 |

Table III (c)

[Fadeometer @ 126° F.]

| Blend No. | IV | V | VI | VII | VIII | IX | X | XI | XII |
|---|---|---|---|---|---|---|---|---|---|
| Elapsed Time of Test: | | | | | | | | | |
| 1 hour | SOC | VSO | VSO | VSO | OK | VSO | VSO | VSO | VSO |
| 2 hours | OC | SOC | VSO | VSO | VSO | VSO | VSO | VSO | VSO |
| 3 hours | OC | SOC | VSO | VSO | VSO | SO | SO | SO | SO |
| 4 hours | OC | SOC | VSO | VSO | VSO | OC | OC | OC | SO |
| 7 hours | | | | | | | | | OC |

SOC—slightly off color.
OC—off color.
VSO—very slightly off color.
OK—no perceptible color change.

It will be noted that with as little as ten parts of dypnone to 90 parts of aromatic petroleum oil when added in the proportion of 40 parts of the mixture to 60 parts of polyvinyl chloride polymer the finished material shows good light stability as measured by the common Fadeometer test. In other words, a plasticizer comprising an aromatic mineral oil fraction containing at least about 10 weight per cent of dypnone is a satisfactory plasticizer for polyvinyl chloride and its copolymers. Or expressed in another manner for light stability a polyvinyl chloride resin compound containing an aromatic petroleum fraction as a plasticizer should contain at least about 4 weight per cent of dypnone based upon the weight of the resin and plasticizer.

Aromatic petroleum fractions suitable for use as plasticizers for vinyl resins are those having characterizing values within the limits set forth in Table IV.

Table IV

| | |
|---|---|
| Gravity °API | 2.0 to 5.0 |
| Flashpoint C. O. C., °F | 350 to 500 |
| Viscosity @ 100° F. (S. U. S.) | 100 to 20,000 |
| Mixed aniline point, °F | 66 to 90 |
| Boiling range | 580 to 850 |

We claim:

1. A new composition of matter consisting essentially of at least about one per cent dypnone and the balance an aromatic petroleum fraction having a gravity of about 2° to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850 °F.

2. A new composition of matter consisting essentially of more than about one per cent of dypnone and the balance an aromatic petroleum fraction having a gravity of about 2° to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850° F.

3. A new composition of matter consisting essentially of about 10 to about 50 per cent dypnone and the balance an aromatic petroleum fraction having a gravity of about 2° to about 5.0° A. P. I., a flash point (Cleveland open cup) of about 350° to about 500° F., a Saybolt Universal viscosity at 100 F. of about 100 to about 20,000 seconds, a mixed aniline point of about 66° to about 90° F., and a boiling range of about 580° to about 850° F.

4. A light stabilized and plasticized polyvinyl chloride resin comprising a polyvinyl chloride resin, at least 0.4 per cent dypnone and the balance sufficient to plasticize said resin of an aromatic petroleum fraction having a gravity of about 2 to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850° F.

5. A light stabilized and plasticized polyvinyl chloride resin comprising about 60 per cent polyvinyl chloride resin, at least about 4 per cent dypnone and the balance an aromatic petroleum fraction having a gravity of about 2° to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850° F.

6. A light stabilized and plasticized polyvinyl chloride resin comprising a major proportion of polyvinyl chloride resin, at least about 4 per cent dypnone and the balance to make 100 per cent and sufficient to plasticize said resin of an aromatic petroleum fraction having a gravity of about 2° to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850° F.

7. A new composition of matter comprising a major proportion of polyvinyl chloride resin and at least 4 per cent of dypnone.

8. A new composition of matter comprising a major proportion of polyvinyl chloride resin and not more than about 40 per cent of dypnone.

9. A new composition of matter comprising a major proportion of polyvinyl chloride resin and about 28 per cent to about 40 per cent of dypnone.

10. A new composition of matter comprising a major proportion of polyvinyl chloride resin, about 4 to about 20 per cent dypnone and the balance an aromatic petroleum fraction having a gravity of about 2° to about 5.0° A. P. I., a flash point (Cleveland open cup) of about 350° to about 500° F., a Saybolt Universal viscosity at 100° F. of about 100 to about 20,000 seconds, a mixed aniline point of about 66° to about 90° F., and a boiling range of about 580° to about 850° F.

PAUL F. BRUINS.
ERNST P. RITTERSHAUSEN.

REFERENCES CITED

The following references are of record in the file of this patent:

UNITED STATES PATENTS

| Number | Name | Date |
|---|---|---|
| 2,427,513 | Spessard | Sept. 16, 1947 |